United States Patent [19]

Petruchik et al.

[11] Patent Number: 4,773,058
[45] Date of Patent: Sep. 20, 1988

[54] DISK HANDLING SYSTEM AND APPARATUS

[75] Inventors: Dwight J. Petruchik, Rush; James M. Grady, Rochester; Dale B. Parks, West Henrietta, all of N.Y.

[73] Assignee: Eastman Kodak Company, Rochester, N.Y.

[21] Appl. No.: 923,508

[22] Filed: Oct. 27, 1986

[51] Int. Cl.⁴ .............................................. G11B 17/04
[52] U.S. Cl. .................................................. 369/77.2
[58] Field of Search ..................... 369/77.2, 291, 75.1, 369/270

[56] References Cited

U.S. PATENT DOCUMENTS

| | | | |
|---|---|---|---|
| 4,278,258 | 7/1981 | Fujita et al. | 369/77.2 X |
| 4,433,410 | 2/1984 | Siryj et al. | 369/77.2 X |
| 4,481,617 | 11/1984 | Mabry | 369/77.2 |
| 4,692,916 | 9/1987 | Rouws | 369/270 X |

Primary Examiner—David Werner
Attorney, Agent, or Firm—Warren W. Kurz

[57] ABSTRACT

Disclosed herein are a system and apparatus for loading data storage disks (e.g. rigid optical disks) onto a spindle assembly for rotation relative to a write/read head. The system is characterized by a disk carrier which is adapted to releasably capture a disk, and apparatus for releasing and separating the disk from the carrier so that the disk can be rotated in a plane spaced from the carrier plane. Such apparatus comprises carrier support means for supporting a disk-capturing carrier in a predetermined plane, disk release means, cooperatable with disk latching members of the carrier, for releasing a disk from the carrier, disk support means for supporting a released disk in the plane of the carrier, and means for imparting relative movement between the carrier support means and the disk support means to locate the disk in a desired plane of rotation, and to locate the carrier in a plane spaced therefrom.

23 Claims, 11 Drawing Sheets

DISK HANDLING SYSTEM AND APPARATUS

BACKGROUND OF THE INVENTION

This invention relates to the field of data recording and playback. More particularly, it relates to disk handling systems and apparatus for loading data storage disks onto a spindle assembly for rotation relative to a write/read head.

The desirability of handling high density data storage disks, e.g. optical and hard magnetic disks, without contacting their delicate data recording surfaces is manifest. With this in mind, it is known in the art to mount such disks in rigid frames, sometimes known as disk "carriers," which serve to support such disks only at their peripheries. Loading of a disk onto the drive spindle of a disk drive unit is effected by apparatus which contacts and manipulates only the disk carrier structure. See, for example, the disk handling system disclosed in U.S. Pat. No. 4,481,617 to Mabry.

In disk handling systems of the above type, the disk carrier component comprises a generally rectangular planar frame having a central circular opening for receiving a disk. The disk is captured within such opening by a plurality of radially extending tabs which extend slightly into the circular opening, on both sides of the disk. By design, the spacing between such disk-capturing tabs is somewhat greater than the disk thickness, thereby enabling the disk to be rotatably driven within the carrier frame, without physically contacting such frame. When loaded into the disk drive unit, the disk carrier must be precisely located relative to the drive spindle so that, when it's captured disk is seated on the drive spindle, the carrier itself is sufficiently spaced from the disk as not to interfere with the disk's rotation.

To alleviate the problem of having to precisely locate a disk carrier so that its captured disk can be rotated within it without interference, one may merely increase the spacing between the disk and the carrier's disk-capturing features. While a relatively "loose fit" between disk and carrier may be an acceptable solution when dealing with data storage disks of a relative rugged nature, it becomes an increasingly unacceptable solution with increasing disk fragility. In fact, certain types of data storage disk can be easily damaged by the axial and lateral movements allowed by disk carriers of the above type. Ideally, such disks should be securely retained within the carrier during all periods of non-use and, just prior to periods of use, released from the carrier and transported to a desired plane of rotation, spaced so far from the carrier that there is no potential for disk/carrier contact during disk rotation. To date, a disk handling system capable of implementing this ideal has not been devised.

SUMMARY OF THE INVENTION

In view of the foregoing discussion, therefore, it is an object of the invention to provide an improved disk handling system of the above type for loading a data storage disk onto a drive spindle of a disk drive unit, a system which is improved at least from the standpoint that the potential for disk damage due to unintended contact between the disk and a disk carrier element, during both disk rotation and storage, is essentially eliminated.

Another object of this invention is to provide a disk handling apparatus, adapted for use with a disk carrier having means for releasably capturing a disk in a fixed position, for selectively releasing a disk from such carrier and for imparting relative movement between the disk and carrier to position the disk in a desired plane of rotation substantially spaced from the disk carrier.

According to the invention the first object above is achieved by a disk handling system comprising a disk carrier for releasably capturing a data storage disk, and disk handling apparatus for releasing and separating a disk from such carrier so that the disk can be rotated in a plane substantially spaced from the carrier. The disk carrier comprises a planar frame having a wall defining an aperture for receiving a data storage disk, and releasable latching means mounted on the frame for releasably capturing a disk in the carrier aperture. The disk handling apparatus comprises (i) carrier support means for supporting a disk carrier and its captured disk in a predetermined plane; (ii) disk release means selectively operable to release a disk from its carrier; (iii) disk support means for supporting a disk within the carrier aperture upon being released by such release means; and (iv) means for imparting relative movement between the carrier support means and the disk support means to locate the released disk in a desired plane of rotation, and to locate the disk carrier in a plane substantially spaced from such desired plane.

The second object of the invention noted above is achieved by a disk handling apparatus of the type mentioned above. Preferably, the carrier support means of such apparatus is stationery, and the disk support means is movable, parallel to the rotational axis of the disk, between a first position in which it supports a disk in the carrier aperture, and a second position in which it locates a disk in the desired plane of rotation, such plane being spaced from the plane of the carrier frame. Also preferred is that the disk release means be movable from a rest position along a predetermined path having a first path portion along which the release means engages and releases the disk-capturing latches of a disk carrier to release a disk from such carrier, and a second path portion along which it drivingly engages the disk support means and effects movement thereof from its first position to its second position.

The details of the invention and its various advantages will be better understood from the ensuing detailed description of a preferred embodiment, reference being made to the accompanying drawings.

DETAILED DESCRIPTION OF PREFERRED EMBODIMENTS

Figure 1:
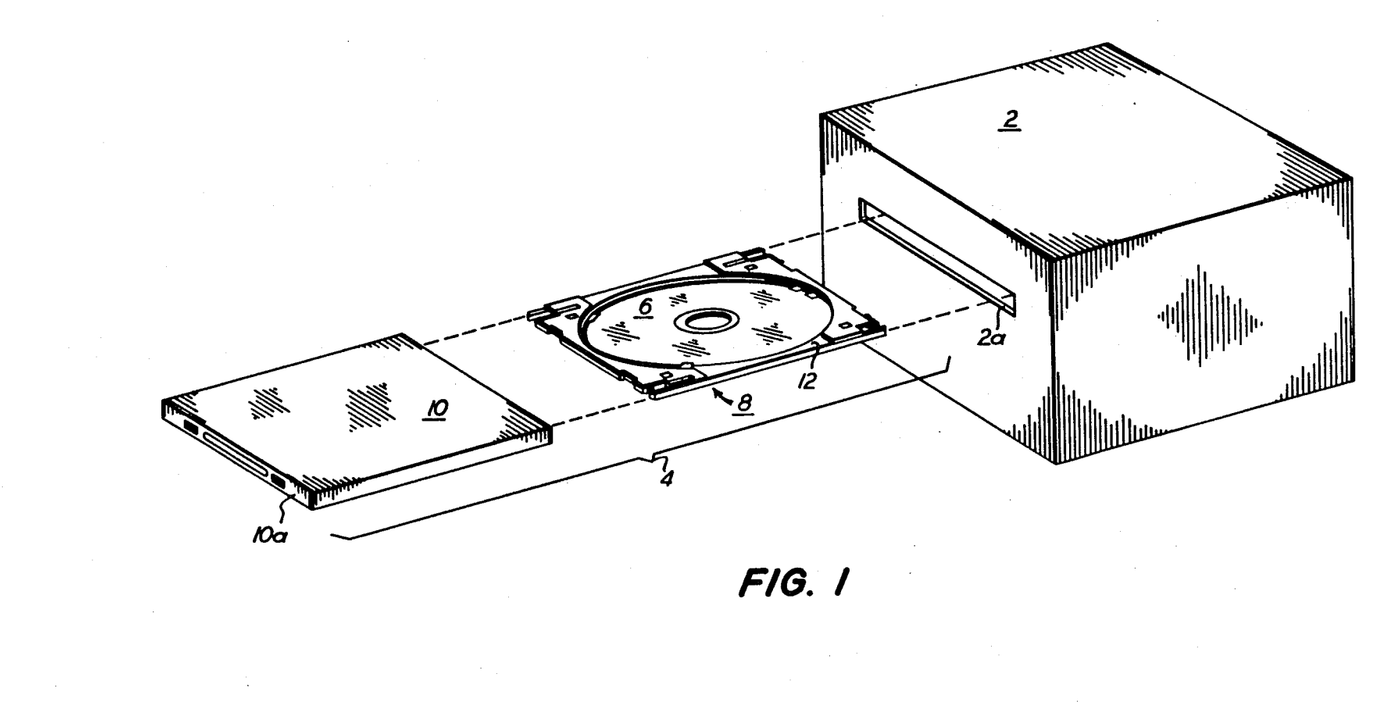
FIG. 1 is a simplified perspective view of a data recording system.

Referring now to the drawings, FIG. 1 illustrates a data recording/playback system comprising a disk drive unit 2 and a data storage disk assembly 4. The latter basically comprises a rigid data storage disk 6, a disk carrier 8 and a protective caddy 10. As explained below, disk carrier 8 serves to releasably capture disk 6 so that the disk is accurately and securely registered within the carrier structure, yet is capable of being readily removed from the carrier for rotation in a plane spaced from the carrier. When not in use, the carrier and its captured disk are positioned within the protective caddy, the latter being sufficiently rigid to guard against contact with the disk's recording surfaces. In use, the carrier-loaded caddy is inserted into the disk drive unit through a door 2a. Upon entering the disk drive unit, a mechanism within serves to extract the disk carrier from the caddy and to return the caddy to the user. The disk drive unit also includes disk handling apparatus (described in detail below) for releasing the disk from its carrier and for loading the disk onto a drive spindle assembly for rotation. The disk carrier, which is described below in some detail, is described in more detail in the commonly assigned U.S. application Ser. No. 923,509, filed concurrently herewith in the names of Daniel J. Stark et al, entitled "Carrier For Data Storage Disk."

Figure 2:
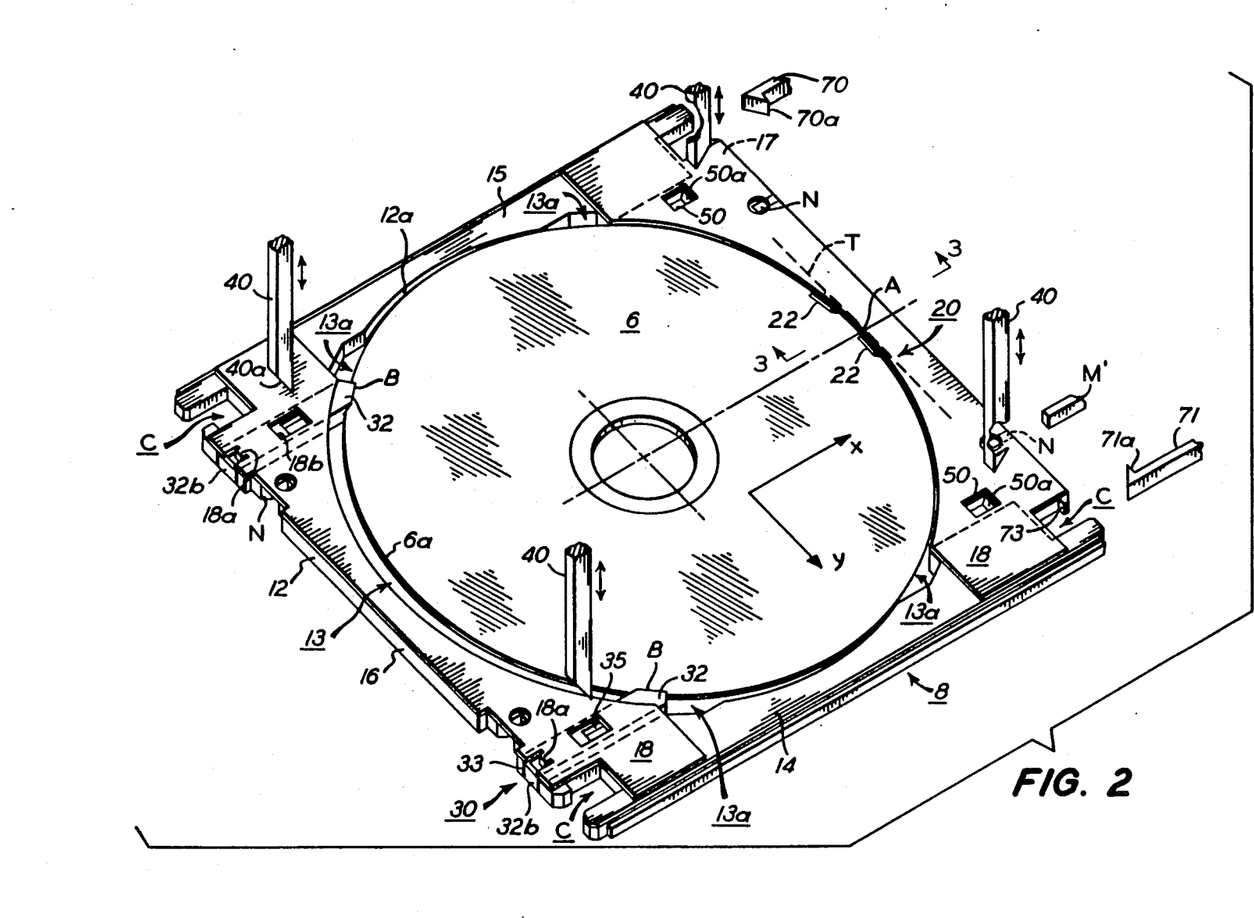
FIG. 2 is a perspective view of a data storage disk and carrier therefor.

In FIG. 2, carrier 8 is shown to comprise a planar frame 12 having a wall portion 12a which defines a generally circular aperture 13 for receiving the rigid data storage disk 6. As shown, the diameter of aperture 13 is slightly larger than the disk diameter to readily accomodate the disk. Further, the generally circular aperture 13 has four expanded regions 13a which accomodate certain disk supporting pads of the disk handling apparatus which serve to support the disk upon release from the carrier. In addition to certain disk latching and unlatching features, described below, the carrier frame is also provided with certain cutouts C and notches N in its leading and trailing edges (as determined by the direction in which the carrier is inserted into the disk drive unit) which cooperate with a carrier locating mechanism (described below) within the disk drive unit for precisely locating the carrier with respect to a desired axis of rotation. As a result of the geometry of such cutouts and notches, the carrier can be inserted into the disk drive unit in any one of four different orientations.

To facilitate carrier manufacture, it is preferred that frame 12 comprise various discrete elements which are mechanically coupled to provide the frame configuration shown. Such elements may comprise, for example, a pair of opposing side rails 14, 15 and end members 16, 17, all of which can be made of plastic (e.g. polycarbonate) and injection molded to produce the shapes shown. A plurality of sheet metal plates 18, e.g. made of aluminum, and suitable fasteners 19 serve to connect elements 14–17 in the manner shown.

As indicated above, carrier 8 comprises disk retention means for accurately positioning and releasably capturing a disk within the plane of the carrier frame. Such disk retention means comprises disk support means 20 for engaging and supporting a disk which is urged into contact therewith at a first location (A) along the disk periphery, and releasable latching means 30 which is adapted to selectively engage a disk at one or more other locations (B) along the disk periphery and to urge such disk into engagement with the support means 20.

Figure 3:
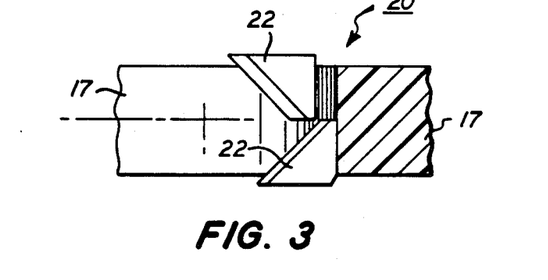
FIGS. 3, 4A, 4B, 5A and 5B illustrate certain details of the disk carrier shown in FIG. 2.

Disk support means 20 may comprise a plurality of stationary support tabs 22 which are mounted on, and extend angularly from, the aperture-defining frame wall 12a. Such tabs, as best shown in the cross-sectional view of FIG. 3, cooperate in supporting a disk, when urged into engagement therewith, from both sides. Preferably, tabs 22 support the disk periphery over a relatively short angular arc of approximately 15°. The length of such arc is a trade-off between providing a secure support, and facilitating release of the disk without substantial displacement of the carrier frame, as described below. preferably, the tabs 22 are integral with wall 12a, being formed by the injection molding process used to fabricate the carrier frame's leading end element 17.

Figure 4A:
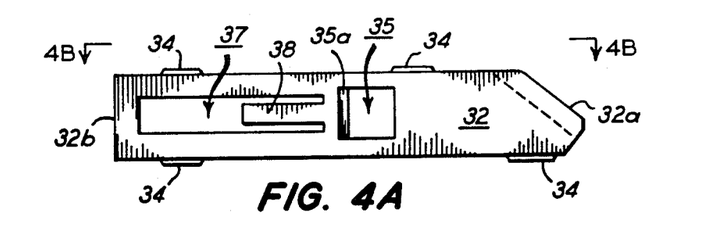
Figure 4B:
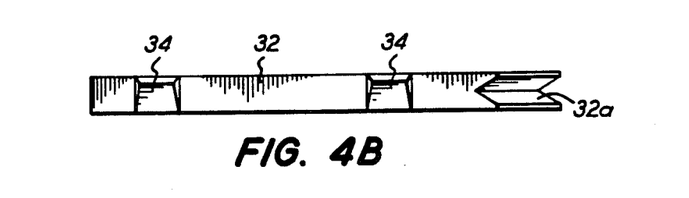

Releasable latching means 30 preferably comprises a pair of movable latching members 32 which are slidably mounted in slots 33 defined by the carrier frame elements for movement in a direction which is generally perpendicular to the tangent T at point A of the disk periphery, i.e. the midpoint of the arc over which support means 20 provides support. Each latching member, as shown in FIGS. 4A and 4B, has a V-shaped latching edge 32a which is arcuately contoured to the shape of the disk periphery and serves to support an engaged disk from both sides. Latching member 32 is also provided with rectangular opening 35 having a chamfered edge 35a which is adapted to be engaged by the tapered edge 40a of a movable skewer 40 (associated with a disk-handling apparatus disclosed below) for the purpose of urging the latching member in a direction to unlatch and release the disk. As explained below, such unlatching movement of member 32 is resisted by a compression spring 36 which, in cooperation with certain carrier frame structure, biases the latching member 32 in the direction perpendicular to tangent T, towards a latching position in which edge 32a is in engagement with the disk periphery. Spring 36 is supported on member 32 by a limb 38 which extends into a slot 37 formed in the interior of member 32.

Figure 5A:
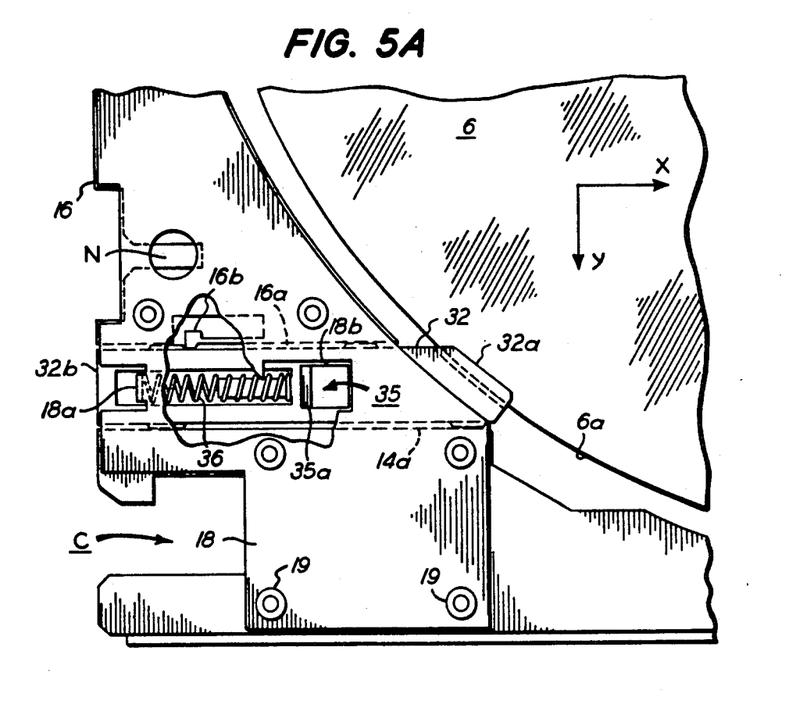
Figure 5B:
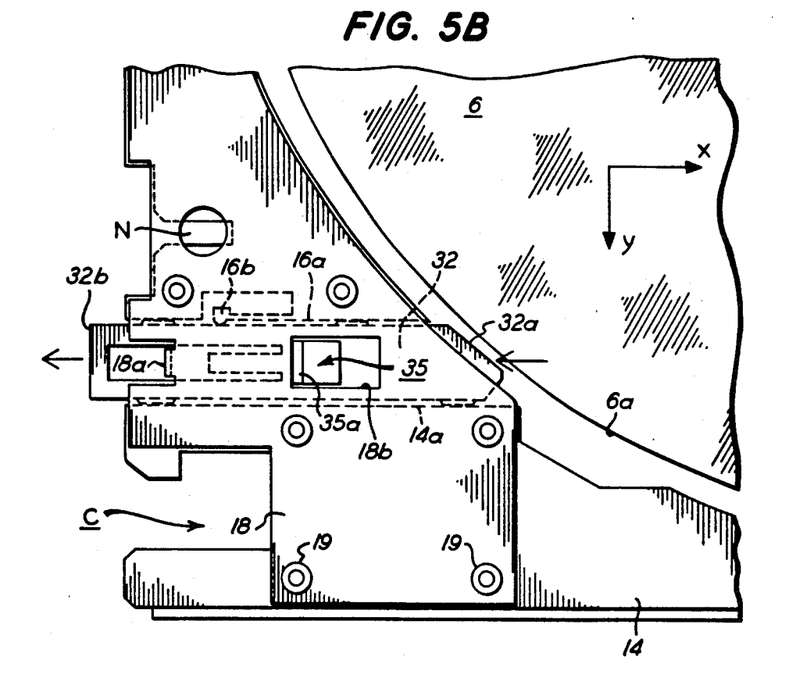

The operation of the latching member is best described with reference to FIGS. 5A and 5B. As shown, latching member 32 is slidably mounted in slot 33, defined by the spaced parallel edges 14a and 16a of frame elements 14 and 16, respectively. As indicated above, elements 14 and 16 are connected by a pair of opposing plates 18 which span members 14 and 16 on both sides of the carrier frame. In FIG. 5A, latching member 31 is shown in a latching position in which the arcuate, V-shaped latching edge 32a is engaged with the peripheral edge 6a of disk 6. Latching member 32 is maintained in this position by the biasing force provided by compression spring 36, one end of such spring engaging the forward end of slot 37 in latching element 34, and the other end being engaged by a pair of opposing bosses 18a extending into slot 33 from plates 18. Access to the latching member's rectangular aperture 35 by skewer 40 is had through slightly larger rectangulsr apertures 18b formed in the opposing carrier plates 18. As an unlatching force, perpendicular to the plane of the drawing, is applied by skewer 40 to the chamfered edge 35a of aperture 35, the latching member is moved to its unlatching position, shown in FIG. 5B.

In addition to the above-described disk-latching features of carrier 8, it is important to note certain additional features which facilitate the release of disk 6 from the carrier frame without substantial displacement of the disk. In carrier frame element 17, there are provided two rectangular openings 50 which are aligned with the unlatching, rectangular apertures 35 of latching members 31. As arranged, the rectangular openings 50 and 35 define a rectangular pattern. Like apertures 35, the rectangular apertures 50 are provided with a chamfered edge which is adapted to be engaged by the camming surface of a disk-release mechanism (described below) of the disk drive unit. Referring to FIG. 2, as the four disk-releasing skewers of the disk-releasing mechanism move in a downward direction, into engagement with the rectangular apertures 50 and 35, the latching members are moved to an unlatching position, as described above, and simultaneously therewith the carrier frame is moved in an opposite direction to free the disk periphery from engagement with the disk support means 20. Thus, the disk is simultaneously freed from all support provided by the carrier, and the disk is thereby released without any substantial displacement in the X direction. Also to be noted is that by virtue of the positioning of the unlatching structure of the invention, the four disk releasing skewers of the disk drive unit can operate on the disk carrier to release the disk therefrom no matter which of the four different orientations the carrier can be inserted, and accurately positioned in the disk drive unit. That is, the carrier may enter the disk drive unit in the orientation shown in FIG. 2, or in an upside down orientation derived by rotating the carrier 180° about the X axis, or in either of these orientations after the carrier has been similarly rotated about the Y axis.

Figure 6:
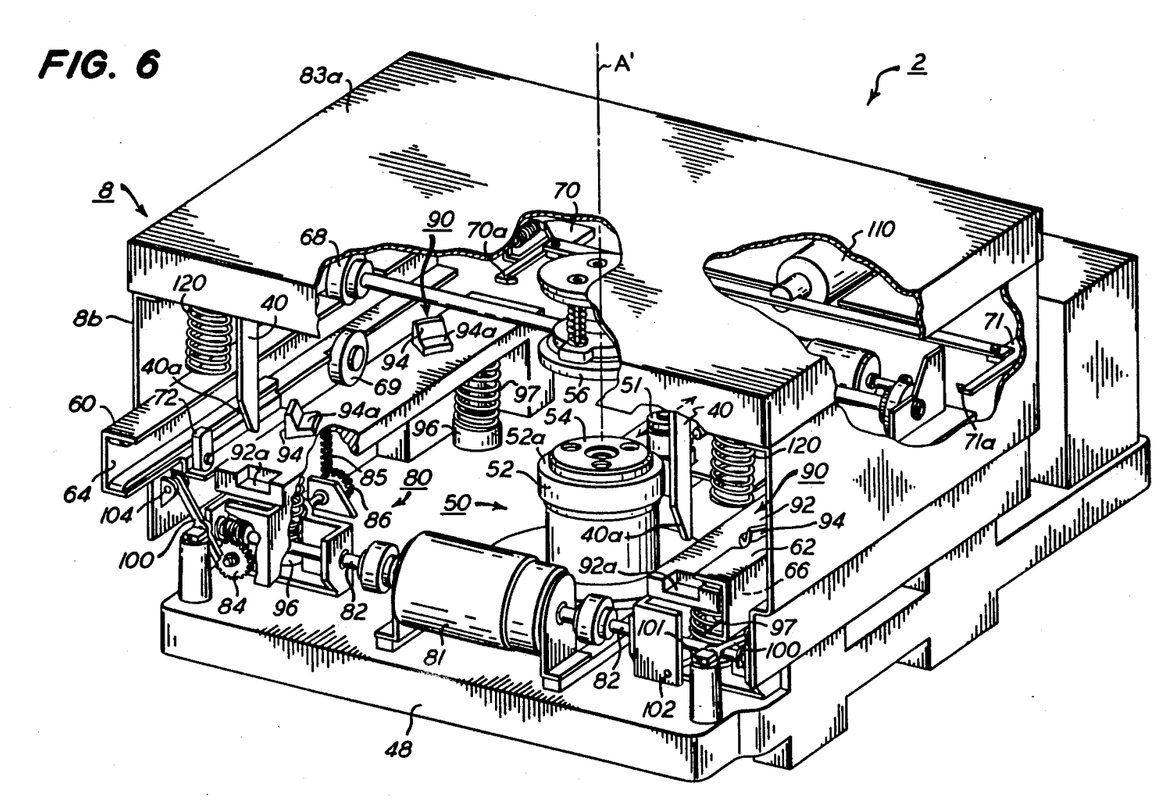
FIG. 6 is a partial perspective view of a disk drive unit embodying the disk handling apparatus of the invention.
Figure 7:
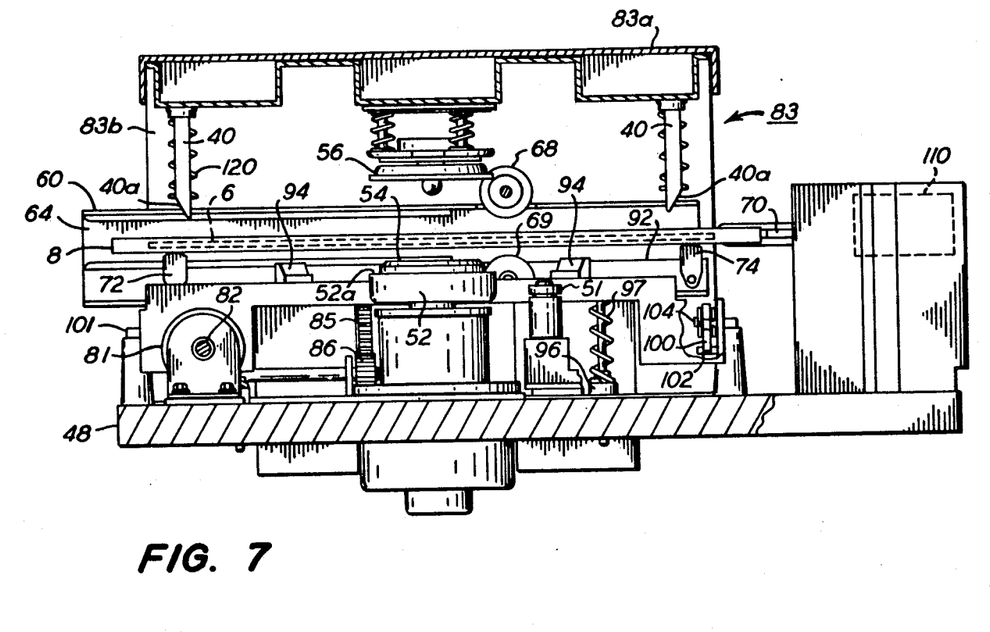
FIG. 7 is a cross sectional view of the FIG. 6 apparatus taken along the section line 7—7.
Figure 8:
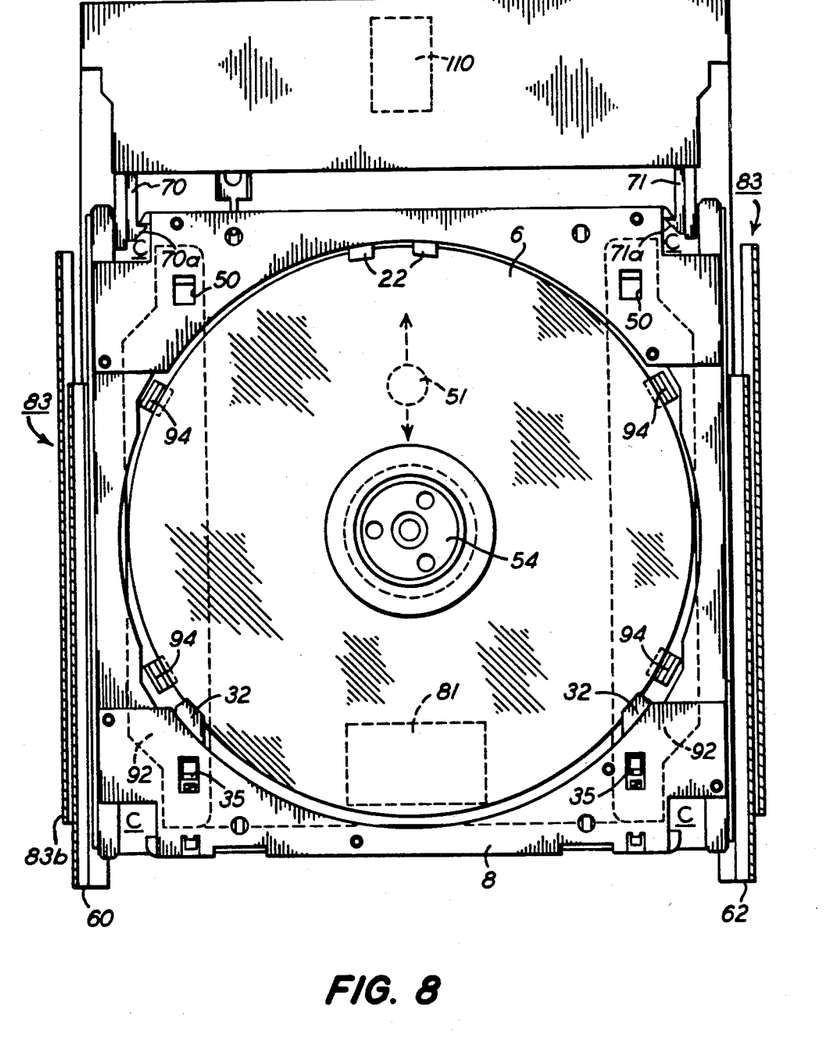
FIG. 8 is a top plan view of the apparatus shown in FIG. 6 showing a disk carrier in a latched position.

Referring now to the remaining drawings and particularly to FIG. 6, disk drive unit 2 basically comprises a base frame 48 which supports a spindle assembly 50 for rotating a data storage disk in a desired plane, and a movably mounted write/read head 51 for writing and/or reading data on the disk as it rotates. The spindle assembly comprises a rotatably driven turntable 52 having a reference surface 52a which supports a disk in the desired plane of rotation, and a frusto-conical centering member 54 which cooperates with a central circular aperture in the data storage disk to center the disk so that its axis of rotation corresponds to the rotational axis A' of the spindle assembly. As explained below, a rotatably mounted clamp 56 engages the upper surface of a rotating disk and prevents it from moving laterally and axially relative to axis A'.

Mounted on the sides of base frame 48 is a pair of spaced, parallel rails 60, 62 (shown in FIGS. 9A–9D) which define a pair of opposing channels 64, 66 for receiving a loaded caddy, i.e. a caddy containing a disk and its carrier. As the caddy is manually inserted into the drive unit through slot 2a (FIG. 1), it is guided by channels 64, 66 toward the rear of the drive unit. After having travelled a predetermined distance, the caddy passes between two pairs of drive/idler rollers 68, 69, one pair being arranged in each channel. A sensor, not shown, senses the presence of the caddy between the roller pairs and activates each of the drive rollers 68. Rollers 68 and 69 frictionally engage the top and bottom surfaces of the caddy and cooperate in advancing the caddy a predetermined distance within the drive unit. As the caddy approaches the end of its forward travel, a pair of spring-biased latches, 70, 71 enters the caddy through a hinged door (not shown) at its leading end and engage the cutouts C of the disk carrier.

Further, a locating member M' enters one of the carrier notches N and precisely locates the carrier in the Y direction relative to the spindle axis. Upon reaching the end of its forward travel in drive unit Z, the carrier activates another sensor (not shown) and the output thereof is used to reverse the direction of rollers 68, 69, thereby reversing the direction of the caddy. As the caddy is advanced in the reverse its direction, the disk carrier is retained within the drive unit by latches, 70, 71, and the laterally protruding surfaces 70a, 71a, thereof engage similarly protruding surfaces 73 of the cartridge cutout C to precisely locate the carrier in the X direction. In this manner, the disk carrier is extracted from the caddy. As the empty caddy is withdrawn from the disk drive unit, two pairs of pivotally mounted and spring-loaded toggels 72, 74, which were formerly depressed from the path of caddy travel by the presence of the caddy in channels 64, 66, snap to an upright position and serve to support the disk carrier in substantially the same plane as that which it occupied within the caddy when the latter was supported by rails 60, 62. Such spring-loaded toggels comprise a means for supporting the carrier and its captured disk in a predetermined plane which is substantially spaced from the desired plane of disk rotation (as determined by reference surface 52a of the turntable).

Upon removal of the disk caddy 10 from the disk drive unit, an elevator mechanism 80 is energized to initiate the release of the captured disk from its carrier. Such mechanism comprises a reversible motor 81 having opposed drive shafts 82, and a movably mounted frame 83 which supports the aforementioned disk-releasing skewers 40. Rotational movement of shafts 82 is translated to a vertical movement of the elevator frame by a gearing arrangement 84 and a rack 85 and pinion 86. Rack 85 is rigidly coupled to frame 83, and the movement of the elevator frame via motor shafts 82 is believed to be self evident from the drawings.

Rigidly mounted to the top plate 83a of frame 83 and extending in a downward direction are the four skewers 40 (briefly mentioned above) which cooperate with the disk carrier structure for releasing a disk from the carrier. As motor shafts 82 rotate in a first direction, the elevator frame is driven in a downward direction from its rest position shown in FIG. 9A. As the disk releasing skewers move downward, their respective tapered ends enter apertures 18b and 50 of the disk carrier. Continued downward movement of elevator frame 83 causes the tapered camming surfaces 40a of two of the skewers to engage the chamfered edges 35a of the openings 35 formed in latching members 32, and to move such latching members out of latching engagement with the disk periphery. Meanwhile, the camming surfaces of the other two skewers engage the chamfered edges of carrier apertures 50 and cause the carrier itself to shift in an opposite direction, that is, opposite the movement of the disk latching members 32. Such movement of the carrier causes the disk retaining means 20 to disengage the disk periphery. Thus, it will be seen that, after the camming surfaces of skewers 40 have penetrated the disk carrier frame, the disk is no longer captured or supported by the carrier. To control the movement of a released disk between the carrier frame and the turntable 52, movable disk support means 90 are provided, such means being described next.

Figure 9A:
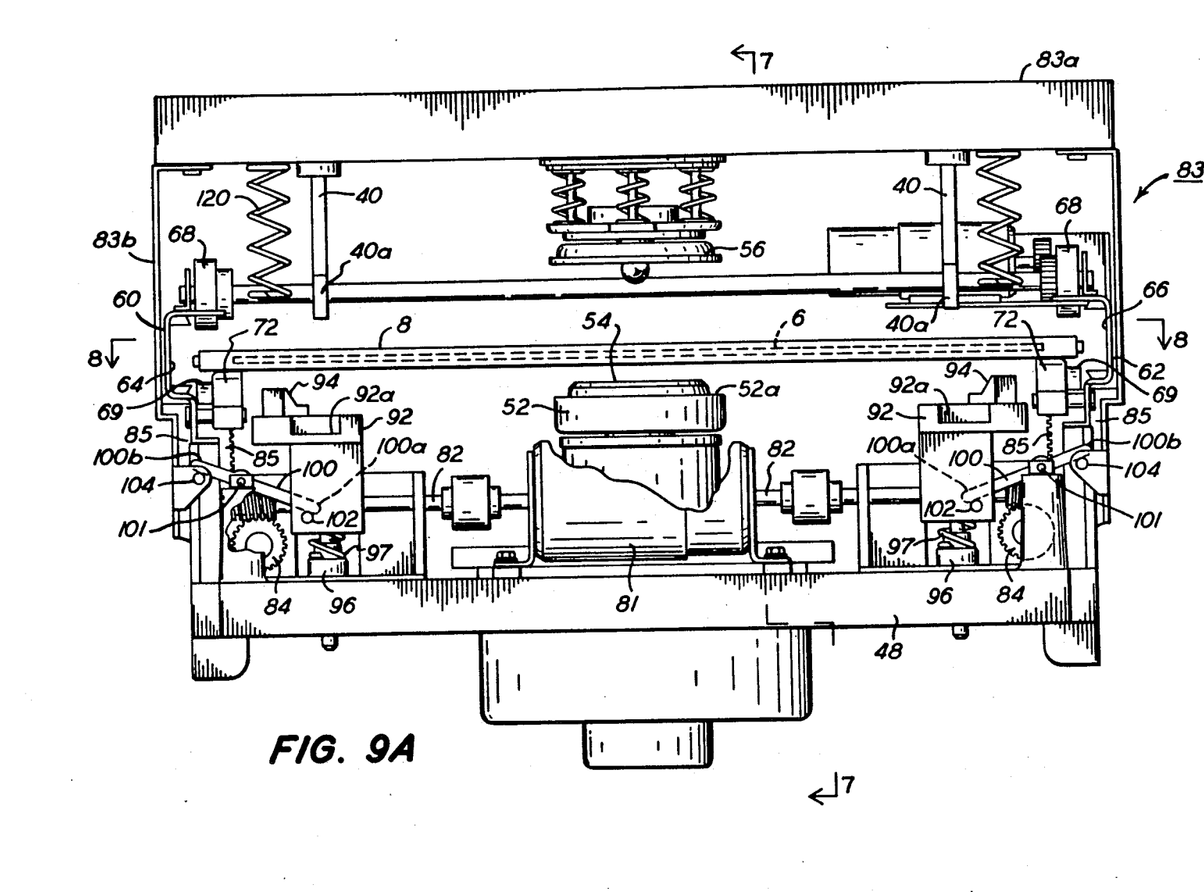
FIGS. 9A–9D are front elevational views taken along line 9—9 in FIG. 8 showing the relative positions of elements at different times in a disk loading cycle.
Figure 9B:
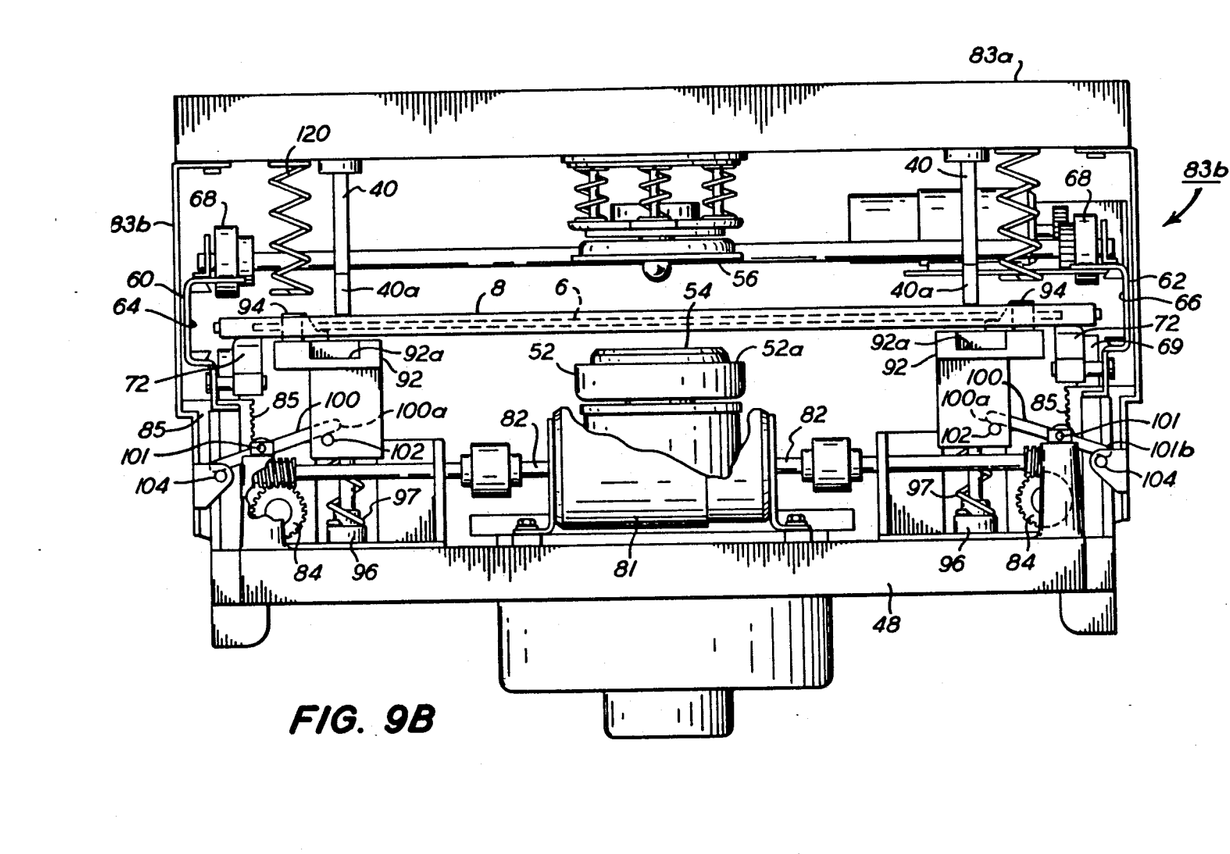
Figure 9C:
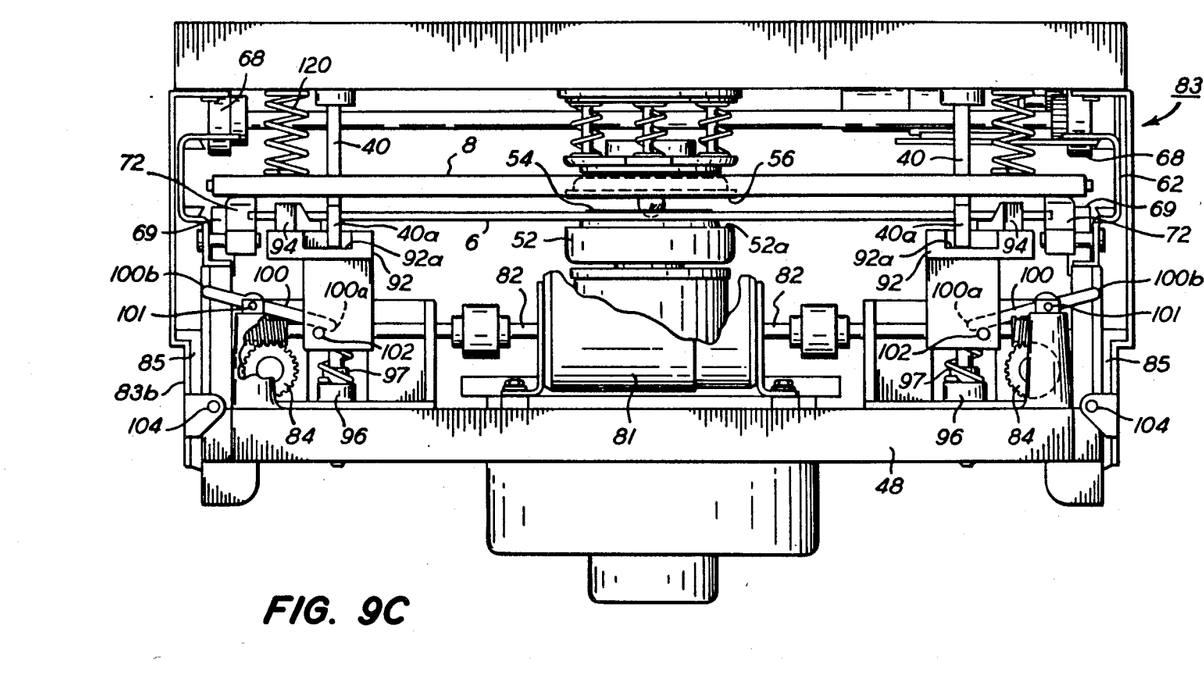
Figure 9D:
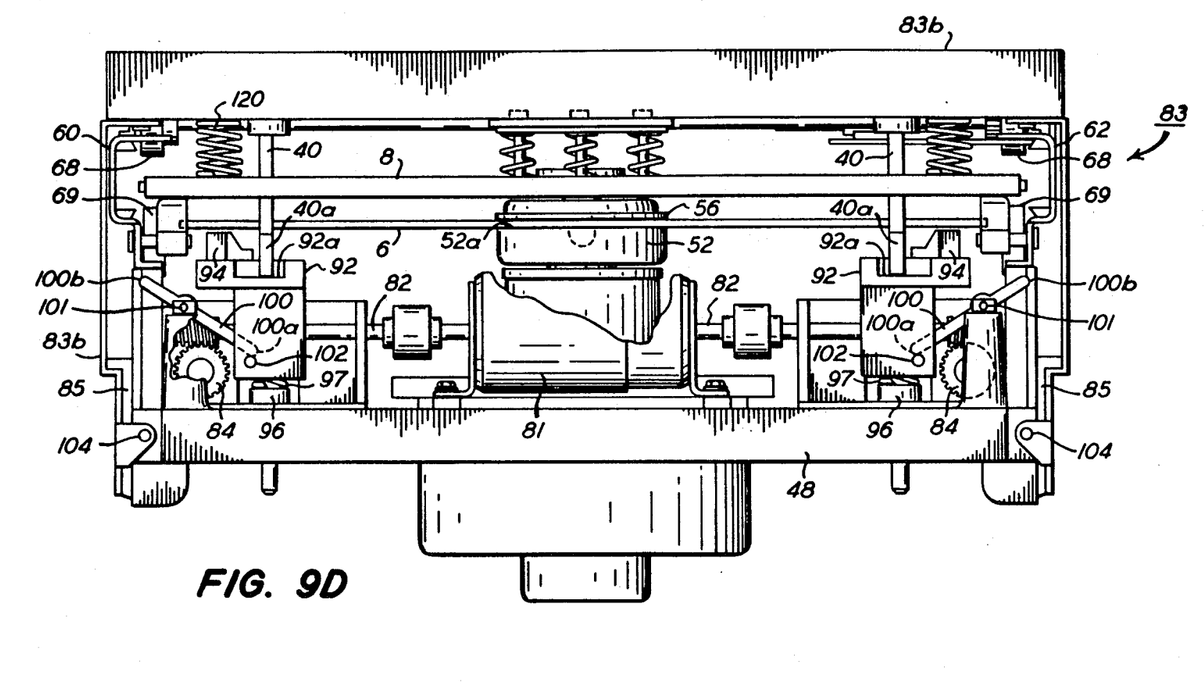

Disk support means 90 comprises a pair of movably mounted platforms 92, each supporting a pair of disk-supporting pads 94. Each platform 92 is movable along a path between an extreme upper position in which the disk-supporting pads 92 function to support a disk in the plane of such carrier, as shown in FIG. 9B, and an extreme lower position in which such pads are spaced substantially below the plane of turntable surface 52a, as shown in FIG. 9D, out of any possible interferences with the rotating disk. Between these extremes, each of the platforms 92 is mounted for sliding movement within a pair of cylindrical sleeves 96 extending upwardly from base frame 48, and compression spring means 97 are provided for biasing such platforms to their respective extreme upper position.

In it extreme upper position, the disk support means would interfere with the loading of a disk caddy into the drive unit. To prevent such interference, four pivotally mounted levers 100 are provided. Each of levers 100 is pivotally mounted on a pivot pin 101 which is supported by the base frame 48. One end 100a of each lever is positioned to engage a bearing surface 102 extending from the disk-supporting platforms 92, and the other end 100b of each lever is positioned to be driven by a bearing member 104 supported by the side wall 83b of elevator frame 83. Referring to FIGS. 6 and 9A, as the elevator frame is moved to its uppermost position, bearing member 104 lifts up on lever end 100b, and tends to rotate the lever in a first direction about its pivot point. Such pivotal movement causes lever end 100a to engage surface 102 and exert a downward force thereon. This force acts to drive the disk support means downward, against the aforementioned spring bias which urges the disk support means toward its uppermost position. Thus, by means of the lever arrangement described, disk support platforms 92 are depressed below the caddy support rails whenever the elevator mechanism is in its uppermost position, and the disk handling apparatus is ready to receive a caddy. These platforms are allowed to return to their uppermost position, under the influence of the spring bias, as the elevator mechanism is driven downward, as it would be to commence the cycle of releasing a disk from the carrier and loading such disk onto the spindle assembly. At the time skewers 40 are in a position to release the disk from the carrier, the disk support pads 94 will have entered the enlarged region 13a of the carrier aperture, and the horizontal support surface 94a of the pads will be positioned to support a released disk in its plane of release.

Having described the release of a disk from carrier 8 and the movement of the disk support platforms between its extreme positions, the loading of a disk onto the spindle assembly will now be described.

At a time just prior to the release of a disk from carrier 8, the elevator frame 83 and disk support means 90 will be positioned as shown in FIG. 9B. As the elevator motor 81 continues to rotate, frame 83 continues to lower, and disk-release skewers 40 penetrate apertures 18a and 50 in the carrier frame and effect release of the disk. Continued downward movement of the elevator frame causes the leading end of skewers 40 to engage four horizontal bearing surfaces 92a associated with the platforms 92. As frame 83 is further lowered, skewers 40 drivingly engage bearing surfaces 92a and effect downward movement of the platforms along a predetermined path defined by sleeves 96. As the disk-supporting platforms are driven downward, the central aperture of disk 6 comes into contact with the centering cone 54 of the spindle assembly and is centered thereby relative to axis A. Finally, the disk comes to rest atop the referenced surfaced of turntable 52, as shown in FIG. 9C.

In order to clamp the now-loaded disk onto the turntable and move the disk support means 90 to a position in which it has no potential for interference with the disk as it rotates, the elevator frame is further advanced downward to the position shown in FIG. 9D. Here, the rotatably mounted disk clamp 56 firmly engages the top surface of the disk at a position radially inward from the recordable region of the disk, and skewers 40 act to hold the disk support platforms in their extreme lowermost position. Note, at this point, bearing surfaces 104 on the elevator frame have lost contact with lever arms 100. To prevent levers 100 from floating between bearing surfaces 102 and 104, one end thereof may be captured by either one of the bearing surfaces which it contacts.

In FIG. 9D, the various components of the disk handling system are shown in their respective positions which allow unimpeded rotation of the disk by the spindle drive assembly. Disk carrier 8 is supported in a plane which is substantially spaced above the desired plane of disk rotation, as determined by reference surface 52a. Further, disk support pads 94 are positioned in a plane substantially spaced below the disk's rotational plane. Thus, any chance for disk damage due to carrier or disk support pad contact during disk rotation is eliminated.

After use of the disk, the disk-loading procedure described above is reversed, and the disk is returned to its carrier. More specifically, elevator motor 81 is now driven in the opposite direction, thereby raising the elevator frame. As skewers 40 move upwardly, the disk-supporting platforms follow, being driven upward by the force of springs 97. As frame 83 rises, clamp 56 disengages the disk surface allowing the disk to be removed from the turntable. Continued upward movement of frame 83 allows the disk-supporting pads 94 to engage the now unclamped disk and to elevate the disk from the turntable. When the disk is elevated to the plane of the disk carrier, the disk support platforms 92 engage a stop (not shown) and further upward movement of the disk ceases. Continued upward movement of frame 83 causes the skewers to become disengaged from the disk carrier, allowing the carrier latches to re-capture the disk. Any tendency for the carrier to move with the skewers as they move upwardly through the carrier less that of frictional forces is prevented by four spring members 120. One end of each of the spring members is mounted to top plate 83a and their respective free ends thereof engage the upper surface of the carrier as shown in the drawings. Still further movement of frame 83 upwards causes bearing surfaces 104 to engage levers 100 and to pivot such levers in a direction to depress the disk support platforms to the level shown in FIG. 9A, a level at which they will not interfere with the removal of the disk carrier (and its captured disk) from the drive unit.

Removal of the carrier from the disk drive unit is achieved by re-inserting the empty caddy into the disk drive slot 2a. As the caddy advances toward the rear of the disk drive unit, the spring-loaded caddy doors are opened by the presence of the carrier in the caddy path, and carrier re-enters the caddy. When the caddy reaches the end of its forward travel into the drive unit, a solenoid 110 is energized to disengage latches 71 from the carrier cutouts C. Thereafter, the caddy and its re-captured carrier are driven in a reverse direction to expel the caddy from the disk drive.

Summarizing the foregoing description, carrier support means 20 serves to support the disk-loaded carrier in a plane substantially spaced from the desired plane of rotation. Movably mounted disk support means 90 serves to transport a disk from the carrier plane and the desired plane of rotation. Disk release means (skewers 40) are movably along a predetermined path having a first path portion along which it engages the disk carrier and acts to release a captured disk therefrom, and a second path portion along which such means drivingly engages the disk support means and physically moves it to a position in which its supported disk is loaded in the desired plane of rotation. Here, the disk is supported by the drive unit's spindle assembly. Thereafter, such disk release means moves along a third path portion in which it functions to move the disk-support means to a remote position where it cannot interfere with disk rotation.

From the foregoing description it will be appreciated that the disk handling system of the invention does not suffer the aforementioned drawbacks of the prior systems. In the present system, the data storage disk is securely retained by the carrier and given no freedom to move therein. Moreover, by virtue of the disk handling apparatus which functions to release the disk from its carrier and to substantially separate (e.g. by about 25 mm) these elements prior to disk rotation, there is no opportunity for the carrier to interfere with disk rotation, nor is there any need to precisely locate the carrier related to the disk's plane of rotation.

The invention has been described in detail with particular reference to preferred embodiments thereof, but it will be understood that variations and modifications can be effected within the spirit and scope of the invention.

We claim:

1. Disk handling system for loading a data storage disk onto a rotatably driven spindle adapted to rotatably support a disk in a desired plane of rotation, said system comprising:
   a. a disk carrier for releasably retaining a data storage disk, said carrier comprising a planar frame having a wall defining an aperture for receiving a data storage disk, and releasable latching means mounted on said frame for releasably retaining a disk in said aperture;
   b. disk handling apparatus for releasing and separating a disk from said carrier, said apparatus comprising:
      (i) carrier support means for supporting said disk carrier and a disk releasably retained thereby in a predetermined plane;
      (ii) disk release means selectively operable to release a disk from said carrier when said carrier is supported by said carrier support means;
      (iii) disk support means for supporting a disk within said carrier aperture when released from said carrier by said release means; and
      (iv) means for imparting relative movement between said carrier support means and said disk support means to locate a disk in such desired plane of rotation, and to locate said disk carrier in a plane substantially spaced from such desired plane.

2. The invention defined by claim 1 wherein said carrier support means is stationary, said predetermined plane is spaced from such desired plane of rotation, and said disk support means is movable between a first position in which it supports a disk in said predetermined plane and a second position in which it locates a supported disk in such desired plane of rotation.

3. The invention as defined by claim 1 wherein said disk release means is movable from a rest position along a predetermined path having a first path portion along which said release means operatively interacts with said latching means to release a disk from said carrier, and a second path portion along which said release means drivingly engages said disk support means and effects movement of said disk support means from its first position to its second position.

4. The invention as defined by claim 3 wherein biasing means are provided for urging said disk support means to its first position, whereby said disk support means returns to said first position when not drivingly engaged by said disk release means.

5. The invention defined by claim 4 wherein means are provided for operatively coupling said disk release means and said disk support means so that said disk support means is in a position spaced from said disk carrier when said release means is in its rest position.

6. The invention as defined by claim 4 wherein said movable release means simultaneously engages said carrier latching means and said disk support means while moving along said predetermined path to maintain said latching means in a non-latching condition while said disk support means moves between its first and second position, whereby said disk carrier is conditioned to receive and latch a disk from said disk support means after said disk support means returns to its first position from its second position.

7. The invention defined by claim 2 wherein said disk support means is movable to a third position, substantially spaced from said predetermined and desired planes, and wherein said predetermined path has a third path portion along which said disk release means drivingly engages said disk support means and effects movement of said disk support means to said third position.

8. Disk handling apparatus for (i) releasing a data storage disk from a disk carrier of the type having releasable latching means for releasably capturing a disk, and (ii) moving a released disk and such carrier relative to one another to position such disk in a desired plane of rotation spaced from such carrier, said apparatus comprising:
   a. disk releasing means operatively connectable with such releasable latching means to selectively release a captured disk from such carrier;
   b. disk support means for supporting a disk upon release from the carrier;
   c. means for imparting relative movement between the carrier and said disk support means to displace a released disk and such carrier, said disk support means being movably mounted for movement between a first position in which it supports a disk when released from such carrier, and a second position in which it locates the released disk in said desired plane of rotation; and
   d. coordinating means for coordinating the relative movement of said disk support means and carrier with the operation of said disk release means, said coordinating means coordinating the movement of said support means with the operation of said release means.

9. Apparatus as defined by claim 8 wherein said release means is movably mounted for movement along a predetermined path having a first path portion in which it acts to engage such latching means for release a disk from such carrier, and a second path portion in which it drivingly engages said disk support means and effects movement of said disk support means from said first position to said second position.

10. Disk handling apparatus for releasing a data storage disk from a disk carrier of the type having releasable latching means for releasably retaining a disk in a predetermined plane, and for transporting a released disk to and from a desired plane of rotation spaced from said predetermined plane, said apparatus comprising:
   a. carrier support means for supporting a disk-retaining carrier in a position to locate a disk in said predetermined plane;
   b. movably mounted disk support means for transporting a disk between said predetermined and desired planes, said disk support means being movable between a first position in which said disk support means supports a disk in said predetermined plane, and a second position in which said support means locates a disk in said desired plane;
   c. disk release means selectively engagable with disk latching means on a disk carrier for releasing a disk from a carrier supported by said carrier support means;
   d. means for moving said disk support means between said first and second positions; and
   e. coordinating means for coordinating the operation of said release means with movement of said disk support means between said first and second positions.

11. The apparatus as defined by claim 10, wherein said disk release means is movably mounted for movement from a rest position along a predetermined path, said path having a first path portion along which said release means interacts with releasable latching means on the disk carrier to release a disk which is releasably captured by such carrier, and a second path portion along which said release means drivingly engages said disk support means and effects movement of said disk support means from its first position to its second position.

12. The apparatus as defined by claim 11 wherein biasing means are provided for urging said disk support means to its first position, whereby said disk support means returns to said first position when not drivingly engaged by said disk release means.

13. The apparatus as defined by claim 11 wherein said movably mounted release means simulataneously engages the carrier latching means and said disk support means while moving along said second path portion to maintain the latching means in a non-latching condition while a disk is transported between said planes, whereby the disk carrier is conditioned to receive a disk from said disk support means after said disk support means returns to its first position from its second position.

14. The apparatus as defined by claim 11 wherein said disk support means is movable to a third position, substantially spaced from said predetermined and desired planes, and wherein said predetermined path has a third path portion along which said disk release means drivingly engages said disk support means and moves said support means to said third position.

15. The apparatus as defined by claim 14 wherein means are provided for operatively coupling said disk release means and said disk support means so that said disk support means is in a position spaced from said predetermined plane when said release means is in its rest position.

16. In a disk drive apparatus adapted to record and/or playback information on a rigid data storage disk, such apparatus comprising a spindle assembly for rotatably supporting a disk for rotation about a predetermined axis in a desired plane of rotation, apparatus for releasing a rigid data storage disk from a disk carrier device spaced from the spindle assembly, and for transporting such released disk to such spindle assembly, such disk carrier being of the type which includes disk-latching means for releasably latching a disk, said apparatus comprising:
   a. carrier support means for supporting a disk-retaining carrier in a predetermined plane spaced from said desired plane;
   b. movably mounted disk support means movable between a first position in which it supports a released disk in said predetermined plane and a second position in which it locates a disk in said desired plane;
   c. means for biasing said disk support means toward its first position;
   d. movably mounted means for releasing a disk from its carrier, said release means being movable along a predetermined path comprising a first path portion in which said release means engages a disk carrier and releases a disk therefrom, and a second path portion in which said release means drivingly engages said disk support means and functions to move said disk support means from its first position to its second position; and
   e. drive means for advancing said release means along said predetermined path.

17. Disk handling apparatus for automatically unloading a rigid data storage disk from a disk carrier contained by caddy, and for locating such disk in a desired plane for rotation, such carrier including a planar frame having a wall defining a circular aperture slightly larger in diameter than a data storage disk, and releasable latching means associated with such wall for releasably retaining a disk within such aperture in the plane of such frame, such caddy comprising a box-like structure having an openable end for receiving a disk-retaining carrier, said apparatus comprising:
   (a) carrier extraction means for extracting a disk-retaining carrier from a caddy containing such carrier, said carrier extraction means comprising (i) drive means for selectively advancing a caddy along a predetermined path in either first or second opposite directions, (ii) gripping means positioned along said path for entering the openable end of a caddy moving in said first direction and for grippingly engaging such carrier, and (iii) sensing means for sensing the gripping engagement of a carrier by said gripping means and for producing an indication thereof, said drive means being responsive to such indication to advance such caddy in said second direction while said gripping means holds the carrier substantially stationery, whereby such carrier is removed from such caddy; and
   (b) disk release and transport means for releasing a disk from a disk-capturing carrier and for relocating such disk in a desired plane for rotation, said release means comprising (i) means for supporting such carrier in a predetermined plane spaced from and substantially parallel to said desired plane; (ii) movably mounted disk support means movable between a first position in which it supports a disk in said predetermined plane, and a second position in which it locates a disk in said desired plane of rotation; (iii) means for moving said disk support means between its first and second position; (iv) latch release means for releasing a disk from such carrier; and (v) means for coordinating the operation of said latch release means with said drive means whereby said disk support means is in its first position when said release eans releases a disk from the carrier.

18. Disk handling apparatus for releasing a data storage disk from a disk carrier of the type having releasable latching means for releasably retaining a disk in a predetermined plane, and for transporting a released disk to a desired plane of rotation, such desired plane being substantially spaced from an parallel to said predetermined plane said apparatus comprising:
   (a) carrier support means for supporting a disk-retaining carrier in a position to locate a disk in said predetermined plane;
   (b) movably mounted disk support means for transporting a disk between said predetermined and desired planes;
   (c) movably mounted release means movable along a predetermined path comprising a first path portion along which said release means engages such latching means and functions to release a disk from a carrier, and a second path portion along which said release means engages said disk support means and functions to move said disk support means from a first position in which said support means supports a disk in said predetermined plane, to a second position in which said support means locates a disk in said desired plane; and
   (d) drive means operable either in a first or second mode for advancing said release means either in a first or second opposite direction respectively along said predetermined path.

19. The apparatus as defined by claim 18 wherein said movably mounted disk support means comprises means for urging said disk support means toward said first position.

20. The apparatus as defined by claim 19 wherein said movably mounted release means simultaneously engages said latching means and said support means while moving along said second path portion to maintain said latching means in a non-latching condition while a disk is transported between said planes, whereby said disk carrier is in a condition to receive a disk when said drive means operates to advance said release means from said second to said first position.

21. Disk handling apparatus for releasing a data storage disk from a disk carrier of the type comprising a planar frame having a wall defining a substantially circular aperture for receiving a disk, disk-retaining means mounted on the wall for supporting a disk received within such aperture and urged into contact therewith, and at least one movable latching member movably mounted on said frame for movement between a first portion which such latching member urges a received disk into engagement with the disk-retaining means, and a second position spaced from the disk periphery, said apparatus comprising:
   means for drivingly engaging such latching member and frame to simultaneously move such latching member in a first direction toward its second position while moving such frame in an opposite direction, whereby a disk is released from the carrier without substantial displacement of the disk.

22. The apparatus as defined by claim 21 wherein said means for drivingly engaging the disk latching member and the carrier frame comprises at least a pair of movably mounted skewers mounted for movement in a direction perpendicular to the plane of the carrier frame, each of said skewers having a beveled edge, the beveled edge of one of said skewers engaging the carrier's disk latching member and acting to urge such latching member, during movement of the skewer, toward such latching member's second position, and the beveled edge of another of said skewers serving to drivingly engage an aperture in the carrier frame and to thereby urge such frame in a direction opposite that in which the first skewer urges the latching member.

23. The apparatus as defined in claim 22 wherein said skewers are rigidly mounted on a movable elevator mechanism.

* * * * *